(12) United States Patent
Yeh

(10) Patent No.: US 7,528,498 B2
(45) Date of Patent: May 5, 2009

(54) WIND POWER SYSTEM

(75) Inventor: Chia-Lung Yeh, Taipei (TW)

(73) Assignee: OA Furniture Co., Ltd., Taipei (TW)

( * ) Notice: Subject to any disclaimer, the term of this patent is extended or adjusted under 35 U.S.C. 154(b) by 0 days.

(21) Appl. No.: 11/857,391

(22) Filed: Sep. 18, 2007

(65) Prior Publication Data
US 2009/0072543 A1 Mar. 19, 2009

(51) Int. Cl.
*F03D 1/02* (2006.01)
(52) U.S. Cl. .......................................... 290/55; 415/4.1
(58) Field of Classification Search ................... 290/55
See application file for complete search history.

(56) References Cited

U.S. PATENT DOCUMENTS

| 1,876,595 | A | * | 9/1932 | Beldimano | 415/60 |
| 2,169,165 | A | * | 8/1939 | Reedy | 416/9 |
| 2,218,867 | A | * | 10/1940 | Beldimano | 416/121 |
| 3,426,214 | A | * | 2/1969 | O'Malley | 290/55 |
| 4,140,433 | A | * | 2/1979 | Eckel | 415/209.1 |
| 4,220,870 | A | * | 9/1980 | Kelly | 290/44 |
| 4,265,086 | A | * | 5/1981 | Bahrenburg | 60/398 |
| 4,321,476 | A | * | 3/1982 | Buels | 290/55 |
| 6,932,561 | B2 | * | 8/2005 | Yoo | 415/4.3 |
| 7,256,512 | B1 | * | 8/2007 | Marquiss | 290/55 |
| 2005/0017514 | A1 | * | 1/2005 | Tocher | 290/55 |
| 2006/0170222 | A1 | * | 8/2006 | Zambrano et al. | 290/55 |

* cited by examiner

Primary Examiner—Joseph Waks

(57) ABSTRACT

The provided wind power system includes a frame, at least a power module installed in the frame and a motor, wherein the number of the at least a power module is increasable, and the respective power module is extractable from the frame through an extraction direction. The respective power module has a fan, a plurality of first wedging surfaces and a plurality of second wedging surfaces, wherein the first and second wedging surfaces respectively manage to cooperate with a second wedging surface of a first additional power module and a first wedging area of a second additional power module, and the motor is connected to the respective power module, thereby the fan of the respective power module being driven by a wind to cause the motor to generate the electricity.

18 Claims, 3 Drawing Sheets

WIND POWER SYSTEM

FIELD OF THE INVENTION

The present invention relates to a power system. More particularly, the present invention relates to a wind power system.

BACKGROUND OF THE INVENTION

Wind power is one of the most well-developed and economical renewable energy types for its infinite availability and environmental protection effects. According to the essential civil electricity quantity demands and civil residential constraints, there are two conventional types of wind power systems designed, which respectively are the vertical-axis wind turbine (VAWT) power system and the horizontal-axis wind turbine (HAWT) power system.

Typically, the VAWT power system includes a set of rotor blades, a gearbox, a generator and guy wires for support thereof, wherein the shaft of the rotor blades is mounted on a vertical axis and perpendicular to the ground for lasting alignment thereof with the wind, so that the rotor blades capture wind kinetic energy for driving the gear box connected to the generator for providing electricity. On the other hand, the HAWT power system includes a set of rotor blades, a gearbox, a yaw-adjustment mechanism and a tower for support thereof, whereas the shaft of the HAWT power system is mounted horizontally and parallel to the grounds, and thus the rotor blades of the HAWT power system are constantly aligned with the wind by the yaw-adjustment mechanism.

However, the number of the set of the rotor blades in both the VAWT and the HAWT power systems are not increasable for raising the electricity capacity correspondingly, and the additional establishments for both the VAWT and the HAWT power systems are costly.

In order to overcome the drawbacks in the prior art, a wind power system is proposed through arduous experiments and research.

SUMMARY OF THE INVENTION

It is a first aspect of the present invention to provide a wind power system.

It is a second aspect of the present invention to provide a wind power system comprising a plurality of power modules.

It is a third aspect of the present invention to provide a wind power system comprising a frame, a plurality of power modules installed in the frame, a generator and a wind guide member, wherein a first respective power module is extractable from the frame through an extraction direction. The first respective power module has a impeller having a spinning shaft perpendicular to the extraction direction, a plurality of first wedging surfaces, wherein the respective wedging surface has a first side and a second side being relatively far from and relatively close to the spinning axle respectively, and a plurality of second wedging surfaces respectively spaced in-between and connected to the plurality of first wedging surfaces for enclosing the impeller, wherein the respective second wedging surface has a third side and a fourth side being relatively close to and relatively far from the spinning shaft respectively, wherein the first and second wedging surfaces respectively manage to cooperate with a second wedging surface of a second respective power module and a first wedging surface of a third respective power module for fixing the first respective power module to the frame. The generator is connected to a fourth respective power module, and the wind guide member is parallel to the extraction direction and rotatably mounting thereon the frame, thereby the frame adjustably rotating to receive a wind so that the respective impellers of the plurality of the power modules are optimally driven by the wind for generating a torque, which is imparted to the generator for generating the electricity.

Preferably, the wind power system further comprises a fixing frame connected to the frame for preventing the wind power system toppling, and the frame is connected to a base stabilizing the frame while rotating.

Preferably, a impeller gear is circumscribed around the impeller and each of the second wedging surface of the plurality of the power modules is assembled with a transmission gear meshing with the impeller gear, so that the impeller gear of the first respective power module assistantly drives respective impeller gears of the second and third respective power modules through a transmission gear of the second respective power module and the transmission gear of the second wedging surface cooperating with the third respective power module for generating the torque imparted to the generator.

Preferably, at least a first frame side of the frame parallel to the extraction direction has at least a first auxiliary block to assistantly fix a fifth respective power module adjacent thereto, wherein the first auxiliary block has a first wedging surface and a second wedging surface.

Preferably, a second frame side of the frame perpendicular to the extraction direction has at least a second auxiliary block to assistantly fix a sixth respective power module adjacent thereto, wherein the second auxiliary block has a first wedging surface and at least a second wedging surface.

Preferably, the frame has an adjustable piece movable along and perpendicular to the extraction direction for preventing a movement of the respective power module along the extraction direction.

Preferably, the frame has an adjustable piece movable along and perpendicular to the extraction direction for preventing a movement of the respective power module along the extraction direction.

Preferably, a direction in the spinning shaft has on the respective first wedging surface a first projection intersecting with the spinning shaft at a first angle, and the spinning shaft direction has on the second wedging surface a second projection intersecting with the spinning shaft at a second angle, wherein a relationship between the first angle and the second angle is one of equality and inequality.

Preferably, the generator is one of a DC generator and an AC generator.

Other objects, advantages and efficacies of the present invention will be described in detail below taken from the preferred embodiments with reference to the accompanying drawings, in which:

DETAILED DESCRIPTION OF THE PREFERRED EMBODIMENT

Figure 1:
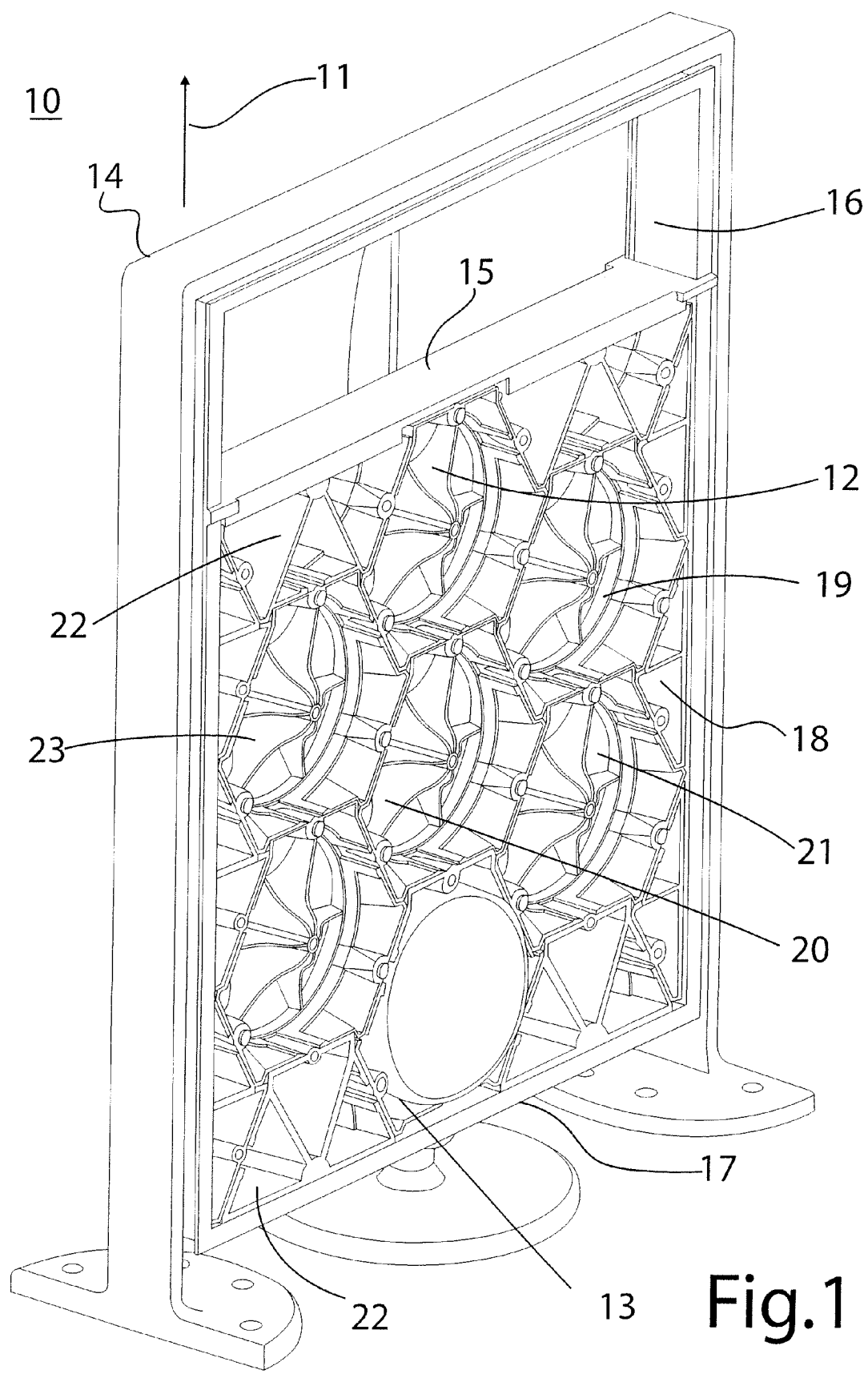
FIG. 1 is a diagram showing the wind power system according to a preferred embodiment in the present invention.

Please refer to FIG. 1, which is a diagram showing the wind power system according to a preferred embodiment in the present invention. The wind power system 10 comprises a frame 14, at least a power module 12 installed in the frame 14 and a generator 13, being one of a DC generator and an AC generator, connected to the respective power module 12, so that a torque resulting from the respective power module 12 driven by a wind is imparted to the generator 13 by the respective power module 12 connected thereto for generating an electricity, wherein the number of the at least a power module 12 is increasable, and the respective power module 12, which manages to cooperate with a first additional power module 19 and a second additional power module 20 for being fixed to the frame 14, is easily extractable from the frame 14 through an extraction direction 11.

Particularly, the frame 14 also has an adjustable piece 15 movable along and perpendicular to the extraction direction 11 for preventing a movement of the respective power module 12 along the extraction direction 11, at least a first frame side 16 of the frame 14 parallel to the extraction direction 11 having at least a first auxiliary block 18 to assistantly fix a third additional power module 21 adjacent thereto, and a second frame side 17 of the frame 14 perpendicular to the extraction direction 11 having at least a second auxiliary block 22, wherein the second auxiliary block 22 manages to assistantly fix a fourth additional power module 23 adjacent thereto.

Figure 2:
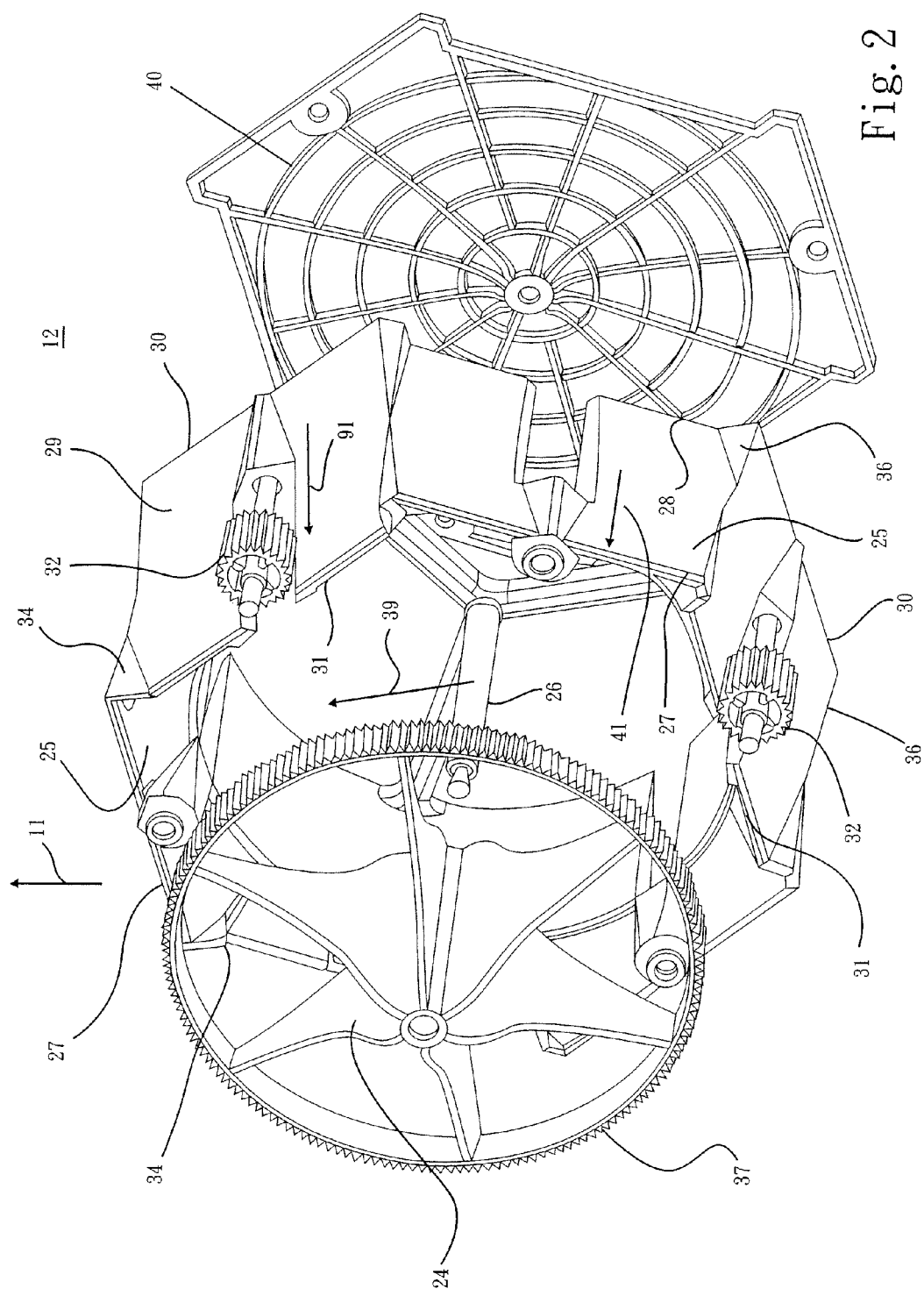
FIG. 2 is an explosion diagram showing the power module in the present invention.

Please refer to FIG. 2, which is an explosion diagram showing the respective power module 12 of the wind power system 10 according to an embodiment of the present invention. The respective power module 12, driven by the wind, includes a impeller 24 having a spinning shaft 26 perpendicular to the extraction direction 11, a plurality of first wedging surfaces 25 and a plurality of second wedging surfaces 29 respectively spaced in-between and connected to the plurality of the first wedging surfaces 25 for enclosing the impeller 24, wherein the respective first wedging surface 25 contains a first side 27 and a second side 28 being relatively far from and relatively close to the spinning shaft 26 respectively, and the respective second wedging surface 29 contains a third side 30 and a fourth side 31 being also relatively far from and relatively close to the spinning shaft 26 respectively. On the other hand, a direction in the spinning shaft 26 has on the respective first wedging surface 25 a first projection 41 intersecting with the spinning shaft 26 at a first angle, and the spinning shaft direction has on the second wedging surface 29 a second projection 91 intersecting with the spinning shaft 26 at a second angle, wherein a relationship between the first angle and the second angle is one of equality and inequality, so that the first wedging surface 25 and the second wedging surface 29 of the respective power module 12 respectively manage to cooperate with a second wedging surface 29 of the first additional power module 19 and a first wedging surface 25 of the second additional power module 20 for fixing the respective power module 12 immovable to the frame 14 with respect to the spinning shaft direction. Alternatively, at least one of two sides of the respective power module 12 respectively corresponding to the first side 27 and the second side 28 of the first wedging surface 25 is provided with a protection net 40 for protecting the impeller 24.

For achieving the purpose of easily extracting the respective power module 12 from the frame 14 through the extraction direction 11, the detailed geometry structural features therefor are further described as follows. As shown in FIG. 2, there are two ends of a specific first side 27 respectively connected to the two second sides 28 adjacent thereto by two first connection areas 34, and two ends of a specific third side 30 of the second wedging area 29 opposite to the first wedging area 25 with the specific first side 27 respectively connected to the two second sides 28 adjacent thereto by two second connection areas 36, wherein the respective first side 27, second side 28, third side 30 and fourth side 31 are perpendicular to the spinning shaft 26, and a vector 39 perpendicular to the spinning shaft 26 and pointing to the specific first side 27 perpendicular to the vector 39 intersects with the extraction direction 11 at 0 degree.

Besides, for the convenience of the installation of the respective power module 12, the respective power module 12 is also installable reversely from the extraction direction 11 when the first wedging surface 25 and the second wedging surface 29 of the respective power module 12 respectively cooperate with the second wedging surface 29 of the first additional power module 19 and the first wedging surface 25 of the second additional power module 20. Correspondingly, the respective power module 12 is also designed in such a way that the first sides 27 and the fourth sides 31 are coplanar and form a first honeycomb unit contour, and, similarly, the third sides 30 and the second sides 28 are coplanar and form a second honeycomb unit contour, each of the contour being respectively symmetrical with respect to the extraction direction 11, wherein the first honeycomb contour is reverse to the second honeycomb unit contour with respect to the extraction direction 11.

Specifically, for generating the torque imparted to the generator 13 for providing the electricity, a impeller gear 37 is circumscribed around the impeller 24, and each of the second wedging surfaces of the respective module is assembled with a transmission gear 32 meshing with the impeller gear 37, so that the impeller gear 37 assistantly drives respective impeller gears 37 of the first additional power module 19 and the second additional power module 20 through a transmission gear 32 of the first additional power module 19 and the transmission gear 32 of the second wedging surface 29 of the respective power module 12 cooperating with the second additional power module 20.

Figure 3:
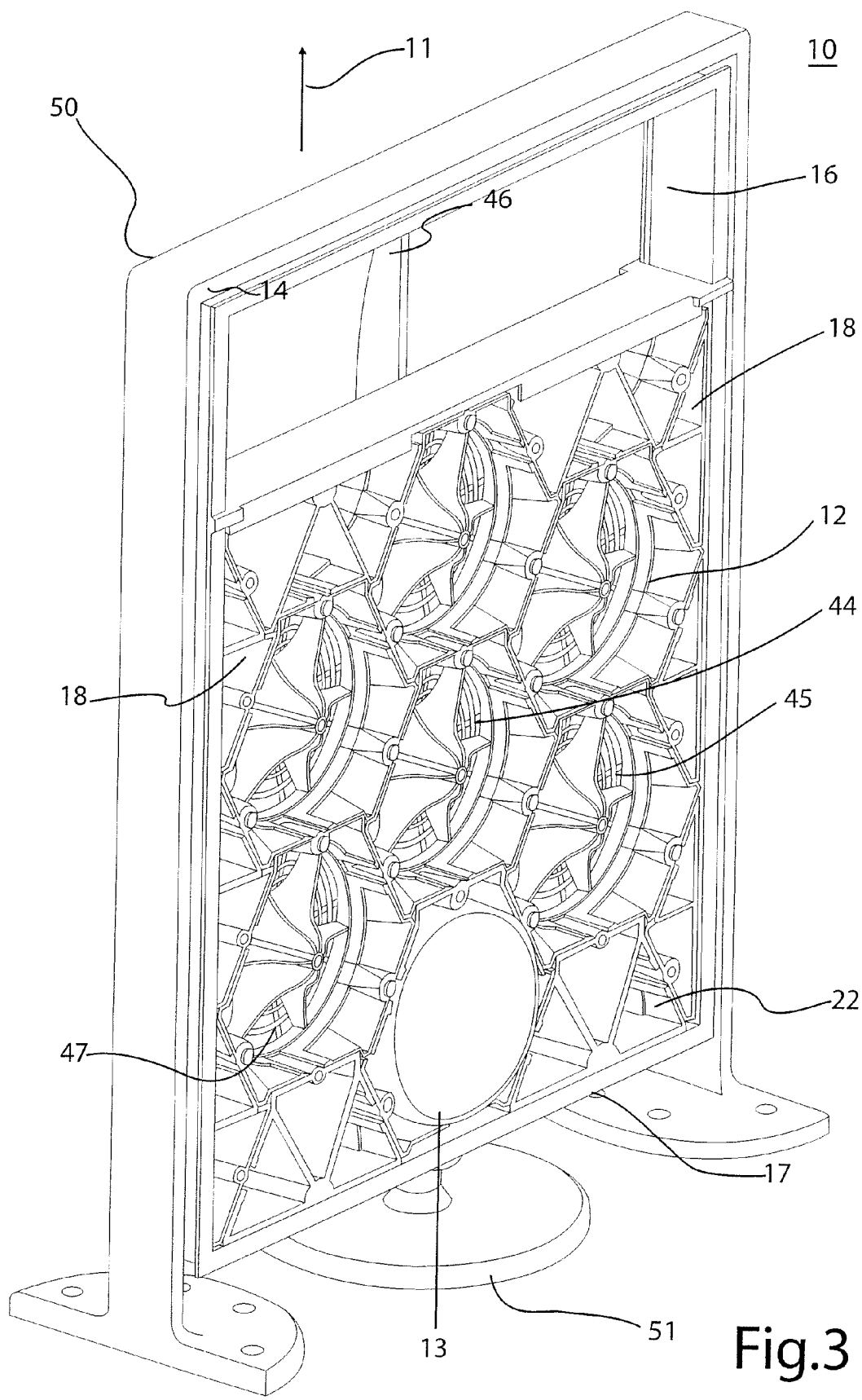
FIG. 3 is a diagram showing the wind power system according to another preferred embodiment in the present invention.

Please refer to FIG. 3, which illustrates a diagram showing the wind power system according to another preferred embodiment in the present invention. The wind power system 10 comprises a frame 14, a plurality of power modules 12 respectively installed in the frame 14 and extractable therefrom through an extraction direction 11, a generator 13 and a wind guide member 46, wherein the respective power module 12 manages to cooperate with a second respective power module 44 and a third respective power module 45 for being fixed to the frame 14. The generator 13 is connected to a fourth respective power module 47. The wind guide member 46 is parallel to the extraction direction 11 and rotatably mounting on the frame 14, thereby the frame 14 adjustably rotating to receive a wind so that the impeller 24 of the respective power module 12 is optimally driven by the wind for generating a torque imparted to the generator 13 for generating the electricity. In addition, the torque is optionally varied through a speed varying gear set (not shown in FIG. 3) provided between the fourth respective power module 47 and the generator 13, so that the output of the electricity generated is further adjustable.

Alternately, the wind power system 10 further comprises a fixing frame 50 connected to the frame 14 for preventing the wind power system 10 toppling, the frame 14 is connected to a base 51 stabilizing the frame 14 while rotating, at least a first frame side 16 of the frame 14 parallel to the extraction direction 11 has at least a first auxiliary block 18, and a second frame side 17 of the frame 14 perpendicular to the extraction direction 11 has at least a second auxiliary block 22, wherein the first auxiliary block 18 has a first wedging surface 25 and a second wedging surface 29, and the second auxiliary block 22 has a first wedging surface 25 and at least a second wedging surface 29.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wind power system, comprising:
    a frame;
    a plurality of power modules installed in the frame, wherein a first respective power module is extractable from the frame through an extraction direction, the first respective power module having:
    an impeller having a spinning shaft perpendicular to the extraction direction and an impeller gear circumscribed around the impeller;
    a plurality of first wedging surfaces, wherein the respective wedging surface has a first side and a second side being relatively far from and relatively close to the spinning axle respectively; and
    a plurality of second wedging surfaces respectively spaced in-between and connected to the plurality of first wedging surfaces for enclosing the impeller, wherein the respective second wedging surface has a third side and a fourth side being relatively close to and relatively far from the spinning shaft respectively and is assembled with a transmission gear meshing with the impeller gear, wherein the first and second wedging surfaces of a first power module respectively manage to cooperate with a second wedging surface of a second respective power module and a first wedging surface of a third respective power module for fixing the first respective power module to the frame such that the impeller gear of the first respective power module assistantly drives respective impeller gears of the second and third respective power modules through a transmission gear of the second respective power module and the transmission gear of the second wedging surface cooperating with the third respective power module for generating a torque imparted to the generator;
    a generator connected to a fourth respective power module; and
    a wind guide member parallel to the extraction direction and rotatably mounting thereon the frame, thereby the frame adjustably rotating to receive a wind so that the respective impellers of the plurality of the power modules are optimally driven by the wind for generating a torque, which is imparted to the generator for generating an electricity.

2. A wind power system as claimed in claim 1, wherein the wind power system further comprises a fixing frame connected to the frame for preventing the wind power system toppling, and the frame is connected to a base stabilizing the frame while rotating.

3. A wind power system as claimed in claim 1, wherein the torque is varied through at least a speed varying gear set provided between the fourth respective power module and the generator.

4. A wind power system as claimed in claim 1, wherein at least a first frame side of the frame parallel to the extraction direction has at least a first auxiliary block to assistantly fix a fifth respective power module adjacent thereto, wherein the first auxiliary block has a first wedging surface and a second wedging surface.

5. A wind power system as claimed in claim 1, wherein a second frame side of the frame perpendicular to the extraction direction has at least a second auxiliary block to assistantly fix a sixth respective power module adjacent thereto, wherein the second auxiliary block has a first wedging surface and at least a second wedging surface.

6. A wind power system, comprising:
    a frame;
    at least a power module installed in the frame, wherein the power module is extractable from the frame through an extraction direction, the respective power module having:
    an impeller having a spinning shaft perpendicular to the extraction direction and an impeller gear circumscribed around the impeller;
    a plurality of first wedging surfaces, wherein the respective wedging surface has a first side and a second side being relatively far from and relatively close to the spinning shaft respectively; and
    a plurality of second wedging surfaces respectively spaced in-between and connected to the plurality of first wedging surfaces for enclosing the impeller, wherein the respective second wedging surface has a third side and a fourth side being relatively close to and relatively far from the spinning shaft respectively and is assembled with a transmission gear meshing with the impeller gear, wherein the first and second wedging surfaces of the respective power module respectively manage to cooperate with a second wedging surface of a first additional power module and a first wedging surface of a second additional power module for fixing the respective power module to the frame such that the impeller gear of the first respective power module assistantly drives respective impeller gears of the second and third respective power modules through a transmission gear of the second respective power module and the transmission gear of the second wedging surface cooperating with the third respective power module for generating a torque imparted to the generator; and
    a generator connected to the respective power module, thereby the impeller of the respective power module being driven by a wind for generating a torque, which is imparted to the generator for generating an electricity.

7. A power wind system as claimed in claim 6, wherein the torque is imparted to the generator by the respective power module for generating the electricity.

8. A wind power system as claimed in claim 6, wherein a direction in the spinning shaft has on the respective first wedging surface a first projection intersecting with the spinning shaft at a first angle, and the spinning shaft direction has on the second wedging surface a second projection intersecting with the spinning shaft at a second angle, wherein a relationship between the first angle and the second angle is one of equality and inequality.

9. A wind power system as claimed in claim 6, wherein the first and second wedging surfaces respectively manage to cooperate with the first additional power module and the second additional power module for fixing the power module to the frame immovable with respect to a direction in the spinning shaft.

10. A wind power system as claimed in claim 6, wherein the respective first, second, third and fourth sides are perpendicular to the spinning shaft, and a vector perpendicular to the spinning shaft and pointing to a specific first side perpendicular to the vector intersects with the extraction direction at 0 degree, wherein two ends of the specific first side are respectively connected to two fourth sides adjacent thereto by two first connection areas, two ends of a specific third side of a second wedging area opposite to the first wedging area with the specific first side are respectively connected to two second sides adjacent thereto by two second connection areas, and the first connection and the second connection areas have two surfaces respectively parallel to a plane constructed by the extraction direction and the spinning shaft, through which the respective power module is extractable from the frame through the extraction direction.

11. A wind power system as claimed in claim 6, wherein the first sides and the fourth sides are coplanar and form a first honeycomb unit contour, and the third sides and the second sides are coplanar and form a second honeycomb unit contour, each of the contour being respectively symmetrical with respect to the extraction direction, wherein the first honeycomb unit contour is reverse to the second honeycomb unit contour with respect to the extraction direction, so that the respective power module is installable reversely from the extraction direction when the first and second wedging surfaces of the respective power module respectively cooperate with the second wedging surface of the first additional power module and the first wedging surface of the second additional power module.

12. A wind power system as claimed in claim 6, wherein at least one of two sides of the respective power module respectively corresponding to the first and the second sides of the first wedging surface is provided with a protection net for protecting the impeller.

13. A wind power system as claimed in claim 6, wherein the frame has an adjustable piece movable along and perpendicular to the extraction direction for preventing a movement of the respective power module along the extraction direction.

14. A wind power system as claimed in claim 6, wherein the generator is one of a DC generator and an AC generator.

15. A wind power system as claimed in claim 6, wherein at least a first frame side of the frame parallel to the extraction direction has at least a first auxiliary block to assistantly fix a third additional power module adjacent thereto.

16. A wind power system as claimed in claim 6, wherein a second frame side of the frame perpendicular to the extraction direction has at least a second auxiliary block to assistantly fix a fourth additional power module adjacent thereto.

17. A wind power system, comprising:
a frame;
at least a power module installed in the frame, wherein the number of the at least a power module is increasable, and the respective power module is extractable from the frame through an extraction direction, the respective power module having:
a impeller;
an impeller gear circumscribed around the impeller;
a plurality of first wedging surfaces; and
a plurality of second wedging surfaces respectively spaced in-between and connected to the plurality of first wedging surfaces for enclosing the impeller and is assembled with a transmission gear meshing with the impeller gear, wherein the first and second wedging surfaces of the respective power module respectively manage to cooperate with a second wedging surface of a first additional power module and a first wedging area of a second additional power module for fixing the respective power module to the frame so that the impeller gear of the first respective power module assistantly drives respective impeller gears of the second and third respective power modules through a transmission gear of the second respective power module and the transmission gear of the second wedging surface cooperating with the third respective power module for generating a torque imparted to the generator; and
a generator connected to the respective power module, thereby the impeller of the respective power module being driven by a wind for generating a torque, which is imparted to the generator for generating an electricity.

18. A wind power system as claimed in claim 17, wherein the torque is imparted to the generator by the respective power module connected thereto for generating the electricity.

* * * * *